Nov. 13, 1934.         G. A. TUCK         1,980,509
TEMPERATURE RESPONSIVE DEVICE
Original Filed Oct. 26, 1931
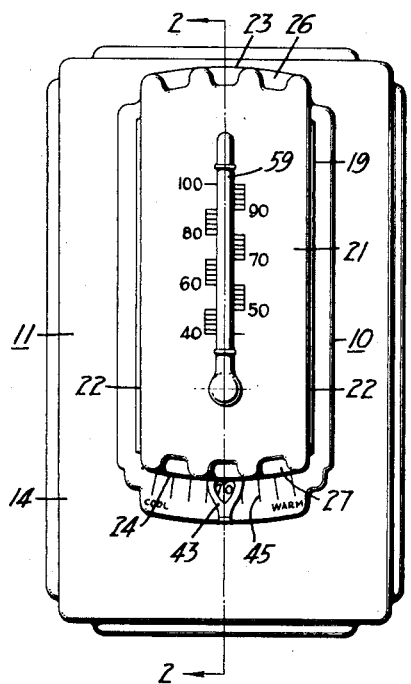
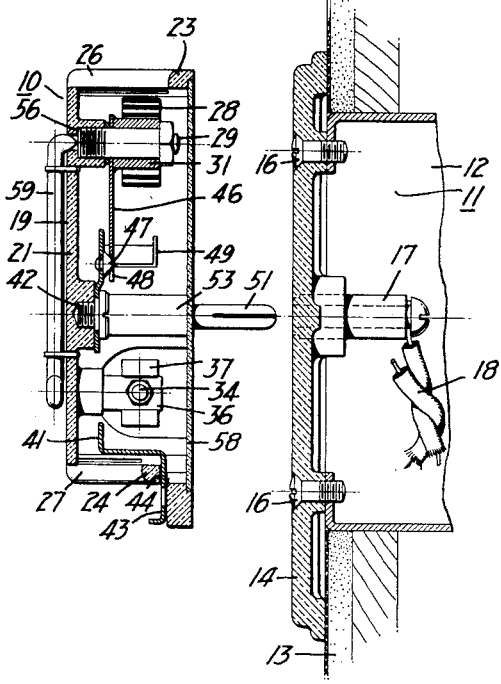
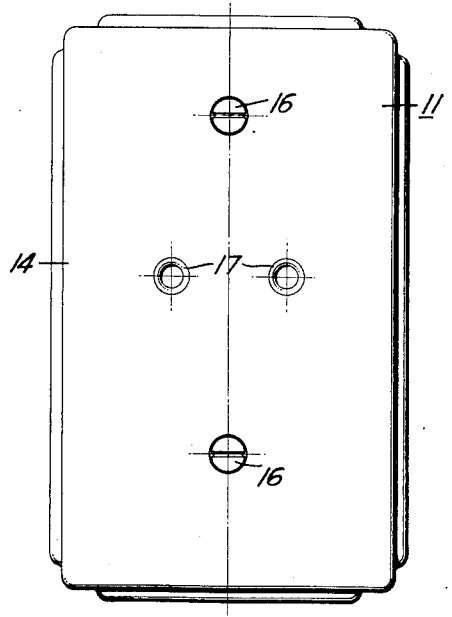
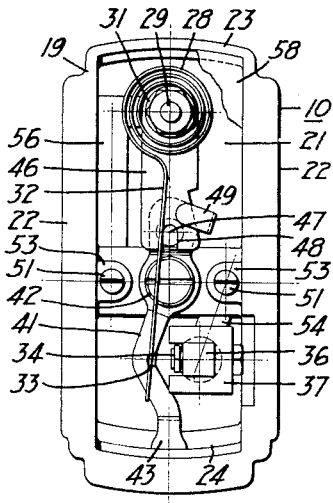
INVENTOR.
George A. Tuck
BY
White, Prost, Fuld & Lothrop
ATTORNEYS.

Patented Nov. 13, 1934

1,980,509

UNITED STATES PATENT OFFICE 1,980,509

TEMPERATURE RESPONSIVE DEVICE

George A. Tuck, San Francisco, Calif., assignor to Atlas Heating and Ventilating Co., Ltd., San Francisco, Calif., a corporation of California Application October 26, 1931, Serial No. 571,019
Renewed September 21, 1934

2 Claims. (Cl. 200—138)

This invention relates generally to temperature devices such as are utilized for controlling electrical circuits, and which are commonly known as electrical thermostats. It relates particularly to devices of this character which are utilized for the control of domestic heating systems.

In domestic heating systems it has become customary to utilize remote control for the heating furnace, so that the temperature of the space being heated can be maintained at a desired level. In most instances the remote control is effected through a control circuit which is opened or closed by the contacts of a thermostat or equivalent temperature responsive device. An attempt is made to locate the thermostat centrally of the space being heated, the most common location in dwellings being in a hallway. It frequently happens that the users of such systems require heat only in certain rooms of the dwelling and in this event if the supply of heat to the other rooms of the dwelling is interrupted, and the thermostat is not located in the rooms to be heated, the control is not automatic and the desired temperature is not maintained. To overcome this difficulty it is not feasible to install thermostats in all of the rooms to be heated, because such a system of control, if not theoretically impossible, would involve complications rendering it impracticable.

It is an object of the present invention to devise a thermostat of the above character which is portable and which can be plugged in at various points at which its control is required.

It is a further object of the invention to devise a thermostat which is of utmost simplicity, and which can be readily manufactured in quantities at a minimum of cost.

Further objects of the invention will appear from the following description in which the preferred embodiment of the invention has been set forth in detail in conjunction with the accompanying drawing. It is to be understood that the appended claims are to be accorded a range of equivalents consistent with the state of the prior art.

Referring to the drawing:

Fig. 1 is a side elevational view of the device incorporating the present invention, the device being shown plugged into a cooperating receptacle.

Fig. 2 is a cross sectional detail taken along the line 2—2 of Fig. 1, showing the device about to be plugged into a receptacle.

Fig. 3 is a front view of the receptacle illustrated in Figs. 1 and 2, with the thermostat removed.

Fig. 4 is a rear elevational view of my thermostat device, the rear cover being removed to expose certain parts to view.

As illustrated in the drawing, a portable structural unit carrying the operating elements of my thermostat has been indicated generally at 10, while the receptacle with which this unit is adapted to cooperate has been indicated generally at 11. While the receptacle 11 can vary in construction, it has been illustrated as comprising a metal outlet box 12, positioned within a room wall 13. A face plate 14, made of suitable material such as a molded phenolic condensate product, is shown secured to box 12 by screws 16. A pair of electrical terminals 17 are shown mounted upon the inner face of cover plate 14, and are electrically connected with the wires 18 of an electrical control circuit.

The particular form of thermostat 10 illustrated in the drawing consists of a casing 19, comprising a front wall 21, side walls 22, and upper and lower end walls 23 and 24. End walls 23 and 24 are provided with slots or openings 26 and 27 to enable ventilation of the interior of the casing. All of these walls are preferably integral with each other, being formed of suitable insulating material such as a molded phenolic condensate product. The elements inclosed within casing 19 include a bimetallic strip 28 which flexes in accordance with temperature changes. This strip is preferably coiled spirally as illustrated in Fig. 4. For retaining the inner end of strip 28, a stud 29 is shown mounted upon front wall 21 (Fig. 2), and rotatably disposed upon this stud there is a collar or sleeve 31 to which the inner end of strip 28 is secured. The outer end of bimetallic strip 28 is secured to a lever arm 32, upon the free end of which an electrical contact 33 is mounted. If desired, lever arm 32 may be merely a continuation of bimetallic strip 28. To cooperate with contact 33, I provide another electrical contact 34, mounted upon a suitable post or standard 36. Standard 36 is likewise mounted upon front wall 21 of the casing, as illustrated in Fig. 2. In addition to the contact 34 there is mounted upon standard 36 a U-shaped electromagnet 37 which acts upon lever arm 32 to effect a relatively quick make and break between the contacts. It is to be noted that in this connection lever arm 32, or at least that portion of it adjacent to contact 33 is of magnetic material so as to serve as an armature for magnet 37.

To provide means for manually setting the thermostat unit to effect operation at a desired temperature level, I provide mechanism including a lever 41 which is fulcrumed to front wall 21 by suitable means such as a screw 42. The offset end portion 43 of the lever 41 extends through a slot 44 in the lower end wall 24, so as to be readily engageable by the fingers of an operator. This portion 43 also forms an indicia cooperating with graduations or markings 45 upon the casing. Fixed to collar 31 surrounding stud 29 there is a member 46, having its free end extending toward screw 42. Mounted upon lever 41 there is a pin or stud 47 engaging in a slot 48 formed in member 46. A finger 49 is also mounted upon lever 41, for purposes which will be presently explained. In order to permit full oscillating movement of lever 41 within the length of slot 44, without interference from stud 36, the lower arm of lever 41 is preferably offset as shown in Fig. 4.

In order to make electrical connection with the contacts 33 and 34 of the thermostat unit, I provide a pair of spaced prong-like terminals 51. For mounting these terminals, side walls 22 of the casing are provided with integral portions 53 in which terminals 51 are embedded. One of the terminals 51 is connected by bus conductor 54 with standard 36 and thence with contact 34, while the other terminal 51 is electrically connected by bus conductor 56 with stud 29 and therefore with movable contact 33. Terminals 51 are so formed and spaced so as to be insertable in the socket-like terminals 17 of the receptacle 11, the engagement affording considerable friction.

For convenience it is preferable to enclose the rear face of casing 19 by a strip 58 of fiber or some other suitable insulating material. Likewise for convenience a small bulb thermometer 59 is mounted upon the front of the casing.

In incorporating my invention with a domestic furnace installation, a number of receptacles 11 are installed in the walls of different rooms to be heated, and the terminals 17 are all connected in parallel with the electrical control circuit. Thermostat unit 10 is then plugged into a receptacle in one of the rooms or spaces to be heated, and where its control in accordance with the temperature of the air is desired. When plugged into a receptacle, prong-like terminals 51 form the sole support for the thermostat unit and the action is substantially the same as if the unit were permanently installed at that point. If it is desired to control the temperature of the air from another room, the unit is simply removed from one receptacle and plugged into another. The temperature level at which the thermostat is effective can be adjusted by changing the setting of lever 41. Changing the angular position of this lever serves to change the angular setting of member 46, which in turn changes the angular setting of the inner end of bimetallic strip 28. In the event the lower portion 43 of lever 41 is moved to the limit of its position toward the left as viewed in Fig. 1, finger 49 comes into engagement with lever arm 32, and thus positively retains contact 33 out of engagement with contact 34. In such setting the thermostat cannot close its contacts irrespective of the temperature of the air to which it is subjected.

I claim:

1. In a temperature responsive device for controlling an electrical circuit, a casing formed of front, side and upper and lower end walls, said upper and lower end walls having openings to permit ventilation of the interior of the casing, all of said walls being formed as an integral molded structure of insulating material, a stud positioned within the casing adjacent one end thereof, said stud being mounted on said front wall, a spiraled bimetallic strip surrounding said stud and carried by the same, a lever arm secured to the outer end of said strip and extending generally in the direction of the other end of the casing, a standard positioned within the casing adjacent the other end thereof, said standard being carried by said front wall, an electrical contact carried by said standard, another electrical contact carried by the free end of said lever arm and adapted to cooperate with said first named contact, and a pair of prong-like electrical terminals mounted upon the side walls of said casing and projecting from the rear face of the same, said terminals having electrical connection with said contacts.

2. In a temperature responsive device for controlling an electrical circuit, a casing formed of front, side and upper and lower end walls, said walls having openings to permit ventilation of the interior of the casing, all of said walls being formed as an integral structure, a stud positioned within the casing adjacent one end thereof, said stud being mounted on said front wall, a bimetallic strip having one end thereof secured to said stud, a lever arm secured to the free end of said strip and extending generally in the direction of the other end of the casing, a standard positioned within the casing adjacent the other end thereof, said standard being carried by said front wall, an electrical contact carried by said standard, another electrical contact carried by the free end of said lever arm and adapted to cooperate with said first named contact, and a pair of prong-like electrical terminals mounted upon said casing and projecting from the rear face of the same, said terminals having electrical connection with said contacts.

GEORGE A. TUCK.